(12) United States Patent
Civette et al.

(10) Patent No.: US 10,737,383 B2
(45) Date of Patent: Aug. 11, 2020

(54) METHOD FOR COMMANDING AN AUTOMATED WORK CELL

(71) Applicant: STAUBLI FAVERGES, Faverges (FR)

(72) Inventors: Rémi Civette, Doussard (FR); Luc Joly, Faverges (FR)

(73) Assignee: STAUBLI FAVERGES, Faverges (FR)

( * ) Notice: Subject to any disclaimer, the term of this patent is extended or adjusted under 35 U.S.C. 154(b) by 374 days.

(21) Appl. No.: 15/897,759

(22) Filed: Feb. 15, 2018

(65) Prior Publication Data

US 2018/0257226 A1    Sep. 13, 2018

(30) Foreign Application Priority Data

Mar. 13, 2017    (FR) ...................................... 17 52013

(51) Int. Cl.
| | | |
|---|---|---|
| *G06F 19/00* | (2018.01) | |
| *B25J 9/16* | (2006.01) | |
| *G05B 19/418* | (2006.01) | |
| *G05B 19/408* | (2006.01) | |

(52) U.S. Cl.
CPC ........... *B25J 9/1602* (2013.01); *B25J 9/1664* (2013.01); *G05B 19/41815* (2013.01); *B25J 9/1692* (2013.01); *G05B 19/4086* (2013.01); *G05B 2219/31076* (2013.01); *Y02P 90/08* (2015.11); *Y10S 901/02* (2013.01)

(58) Field of Classification Search
CPC ...... B25J 9/1602; B25J 9/1664; B25J 9/1692; G05B 19/41815; G05B 19/4086; G05B 2219/31076; Y02P 90/08; Y10S 901/02
USPC ....................................................... 700/262
See application file for complete search history.

(56) References Cited

U.S. PATENT DOCUMENTS

| | | | | |
|---|---|---|---|---|
| 5,086,400 A | * | 2/1992 | Hayati ................... | B25J 9/1689 |
| | | | | 700/260 |
| 9,400,170 B2 | * | 7/2016 | Steffey ................. | G01B 21/045 |
| 9,795,446 B2 | * | 10/2017 | DiMaio .................. | A61B 34/10 |
| 10,603,127 B2 | * | 3/2020 | Hasser ................... | A61B 34/37 |

(Continued)

FOREIGN PATENT DOCUMENTS

| | | |
|---|---|---|
| EP | 3112095 A1 | 1/2017 |
| WO | 2011110278 A1 | 9/2011 |
| WO | 2011141684 A1 | 11/2011 |

OTHER PUBLICATIONS

Search Report for Priority Document, French Patent Application No. 1752013, dated Dec. 21, 2017.

*Primary Examiner* — Ronnie M Mancho (57) ABSTRACT

This method of controlling an automated work cell provided with a robot arm comprises the steps of:
a) calculating Cartesian instructions corresponding to the nominal articular instructions;
b) calculating actual articular instructions from the Cartesian instructions, taking into account actual geometrical parameters of the robot arm;
c) calculating for each nominal articular instruction and from the actual articular instruction, an articular instruction correction value;
d) calculating, for each nominal articular instruction and from the calculated articular correction instruction, an effective articular instruction;
e) calculating control instructions for each motor controller from the calculated effective articular instructions;
f) transmitting the motor control instructions to each motor controller.

13 Claims, 5 Drawing Sheets

(56) References Cited

U.S. PATENT DOCUMENTS

| | | | | |
|---|---|---|---|---|
| 2011/0238083 A1* | 9/2011 | Moll | ...................... | A61B 34/76 606/130 |
| 2012/0071752 A1* | 3/2012 | Sewell | ................... | A61B 34/74 600/424 |
| 2015/0141972 A1* | 5/2015 | Woodley | ............. | A61F 9/00827 606/5 |

* cited by examiner

METHOD FOR COMMANDING AN AUTOMATED WORK CELL

The present invention relates to a method of commanding an automated work cell. The invention also relates to an automated work cell.

In the field of industrial robotics, it is known to use an automated work cell which comprises a robot arm articulated according to several degrees of freedom.

In general, an industrial robot has the function of ensuring the positioning and orientation of a tool in space following a predefined trajectory.

In many applications, the trajectory that the robot arm should follow is given by points and orientations expressed in a Cartesian coordinate system. This is particularly the case when the robot is used to implement machining operations performed by a tool carried by the robot arm.

When this type of application is performed by an automated work cell having a control center in communication with a robot controller and the control center implements the generation of the trajectory, the control center is programmed to transform the positions and the orientations of the tool, expressed in a Cartesian coordinate system, into coordinates or articular instructions, which correspond to the various degrees of freedom of the robot arm.

The control center applies an inverse kinematic transformation, which uses a geometric model of the robot arm and inversion calculations. Typically, this geometric model comprises theoretical geometrical parameters corresponding to an ideal geometrical representation of the robot arm.

The inversion calculations depend on the type of robot arm used as well as the geometric characteristics of the articulations. During the design of the robot arm, these geometric characteristics are often chosen in order to facilitate subsequent inversion calculations, for example by choosing parallel and/or concurrent articulation axes.

However, in practice, the robot arms always present a greater or lesser deviation from their theoretical representation, due to the inherent variability of any industrial manufacturing process. Thus, the actual geometrical parameters of the robot arm differ from the theoretical geometrical parameters on which the model is based.

If these differences are not taken into account, there is a risk that, during operation of the robot arm, the trajectory actually followed will be different from the desired trajectory.

To remedy this, methods are known for the calibration or benchmarking of the robot arm, which allows the accurate determination of the actual geometric parameters of the arm. The most common way to describe the geometry of a robot arm is to use Denavit-Hartenberg formalism which allows one to express the position of a robot arm segment by comparison with the one that precedes it, based on four parameters. The implementation of the calibration method provides a measure of the set of Denavit-Hartenberg parameters that constitute actual geometrical parameters.

These actual geometrical parameters are introduced only at the stage of the inverse transformation between the Cartesian coordinates defining the trajectory and the articular coordinates that are sent to the controller of the robot arm.

In this case, the differences between the measured parameters and the theoretical parameters may lead to the loss of the geometric characteristics which made it possible to facilitate the inversion calculation. For example, axes of articulation theoretically chosen to be parallel and/or concurrent in order to facilitate inversion calculations, may in fact not be so. It is then necessary to implement more complex inversion calculations that are able to account for these differences.

The control program of the control center must thus implement, in addition to the kinematic model specific to the robot arm used, an inverse transformation capable of taking into account the actual geometrical parameters.

Such a constraint is undesirable in an industrial context because it complicates the development of control programs. Inverse transformations are particularly resource consuming. In addition, this requires the implementation in the control center of programs capable of processing the actual geometrical parameters of the robot arm resulting from the calibration process. In addition, since the actual geometrical parameters are variable from one robot arm to another, the programmer of the control center must ensure strict management of the actual geometrical parameters. The invention seeks to remedy these drawbacks by proposing a control method for an automated work cell comprising an articulated robot arm, wherein the programming is simplified and made feasible without requiring a priori knowledge of the actual geometrical parameters of the robot arm.

For this purpose, the invention relates to a method for controlling an automated work cell, wherein the work cell comprises:
- a robot arm articulated with at least three degrees of freedom, wherein this robot arm may be controlled according to articular instructions and comprise motors adapted to maneuver parts of the robot arm;
- a control center that is able to control the operation of the work cell from movement commands;
- a robot controller, including motor controllers each controlling the operation of an motor;
- a communication bus between the control center and the robot controller;

wherein this control method comprises the steps of:
- y) calculating, by the control center, nominal articular instructions using a trajectory generator, based on the movement commands;
- z) transmitting the nominal calculated articular instructions to a calculation unit belonging to the robot controller via the communication bus;

and the steps of:
- a) calculating Cartesian instructions corresponding to the nominal articular instructions via the calculation unit;
- b) calculating actual articular instructions, from the Cartesian instructions via the calculation unit by taking into account actual geometrical parameters of the robot arm;
- c) calculating for each nominal articular instruction and from the actual articular instruction, an articular instruction correction value;
- d) calculating for each nominal articular instruction and from the established articular instruction correction, an effective articular instruction, wherein the effective articular instruction is the sum of the nominal articular instruction and the articular instruction correction;
- e) calculating command instructions for each motor controller from the calculated effective articular instructions;
- f) transmitting the motor command instructions to each motor controller to control the corresponding motor according to the engine control instruction.

By virtue of the invention, the positioning and the orientation of the robot arm are performed accurately without the programming of the control center becoming complicated, by calculating articular instruction correction values from nominal articular instructions issued by the control program and from the actual articular instruction developed by the calculation unit belonging to the robot controller, which takes into account the actual geometrical parameters of the robot arm. This actual articular instruction is calculated during the execution of the program, according to the nominal articular instructions received.

In this way, the development of the control program of the control center does not require prior knowledge of the calibration result. The actual geometrical parameters of the robot arm are used for articular instruction correction in a transparent way during program execution. In other words, when developing the control program, it may be assumed that the robot arm is a perfect robot arm, whose geometric properties are faithfully represented by the theoretical model. The design of the control program of the work cell is greatly simplified in this way. In addition, the same program may be implemented on different work cells without having to take into account the differences of the respective robot arms relative to the perfect robot arm.

According to advantageous but non-mandatory aspects of the invention, such a method may incorporate one or more of the following characteristics, taken alone or in any technically feasible combination:

- in step c), the articulation instruction correction value is chosen to be zero if the absolute value of the difference between the actual articular instruction and the nominal articular instruction is greater than a predefined threshold, wherein the correction value of the articular instruction is chosen to be equal to the difference between the actual articular instruction and the nominal articular instruction in the contrary case.
- in step c), the articular instruction correction value is chosen to be equal to the difference between the actual articular instruction and the nominal articular instruction.
- in step c), a low-pass filter is applied by the calculation unit to the calculated articular instruction correction value.
- the applied filter is a finite impulse response low pass filter.
- the filter comprises three boxcar filters applied in series.
- the method also comprises the steps of:
  g) transmitting the actual position of the motor driven by the controller to the calculation unit;
  h) calculating the actual articular positions of the robot arm from the actual positions of the motors via the calculation unit;
  i) calculating the nominal articulated positions of the robot arm by the calculation unit, then subtracting from each operative articular position the articular instruction correction value calculated for the corresponding nominal articular instruction;
  j) transmitting the nominal articular positions calculated during step i) to the control center.
- In step y), the movement commands define the positions and orientations of the robot arm expressed in a Cartesian coordinate system, while the control center implements a theoretical inverse kinematic model by taking into account theoretical geometrical parameters of the robot arm.
- In step y), the nominal articular instructions are calculated from a theoretical inverse kinematic model of the robot arm parameterized by theoretical geometrical parameters of the robot arm, while in step b), the actual articular instructions are calculated from an actual analogous inverse kinematic model parameterized by actual geometrical parameters of the robot arm.

According to another aspect, the invention relates to an automated work cell comprising:
- a robot arm articulated with at least three degrees of freedom, wherein this robot arm may be controlled according to articular instructions and comprises motors adapted to maneuver parts of the robot arm;
- a control center that is able to control the operation of the work cell based on movement commands;
- a robot controller, including motor controllers, each controlling the operation of a motor;
- a communication bus between the control center and the robot controller;

wherein the work cell is programmed to implement the steps of:
y) calculating nominal articular instructions from the movement commands via the control center using a trajectory generator;
z) transmitting the nominal calculated articular instructions to a calculation unit belonging to the robot controller via the communication bus;

and the steps of:
a) calculating Cartesian instructions corresponding to the nominal articular instructions via the calculation unit;
b) calculating actual articular instructions, from the Cartesian instructions via the calculation unit by taking into account actual geometrical parameters of the robot arm;
c) calculating for each nominal articular instruction and from the actual articular instruction, an articular instruction correction value;
d) calculating for each nominal articular instruction and from the established articular instruction correction, an effective articular instruction, wherein the effective articular instruction is the sum of the nominal articular instruction and the articular instruction correction;
e) calculating command instructions for each motor controller from the calculated effective articular instructions;
f) transmitting the motor command instructions to each motor controller to control the corresponding motor according to the engine control instruction.

Optionally, during step y), the movement commands define the positions and orientations of the robot arm expressed in a Cartesian coordinate system, while the control center implements a theoretical inverse kinematic model taking into account theoretical geometries of the robot arm.

In step y), the nominal articular instructions are calculated from a theoretical inverse kinematic model of the robot arm parameterized by theoretical geometrical parameters of the robot arm, while in step b), the actual articular instructions are calculated from a similar actual inverse kinematic model parameterized by actual geometrical parameters of the robot arm.

Finally, according to an advantageous but non-mandatory aspect of the invention, such a work cell may comprise computer memories containing executable computer instructions adapted to implement steps y), z) and a) to f).

Figure 1:
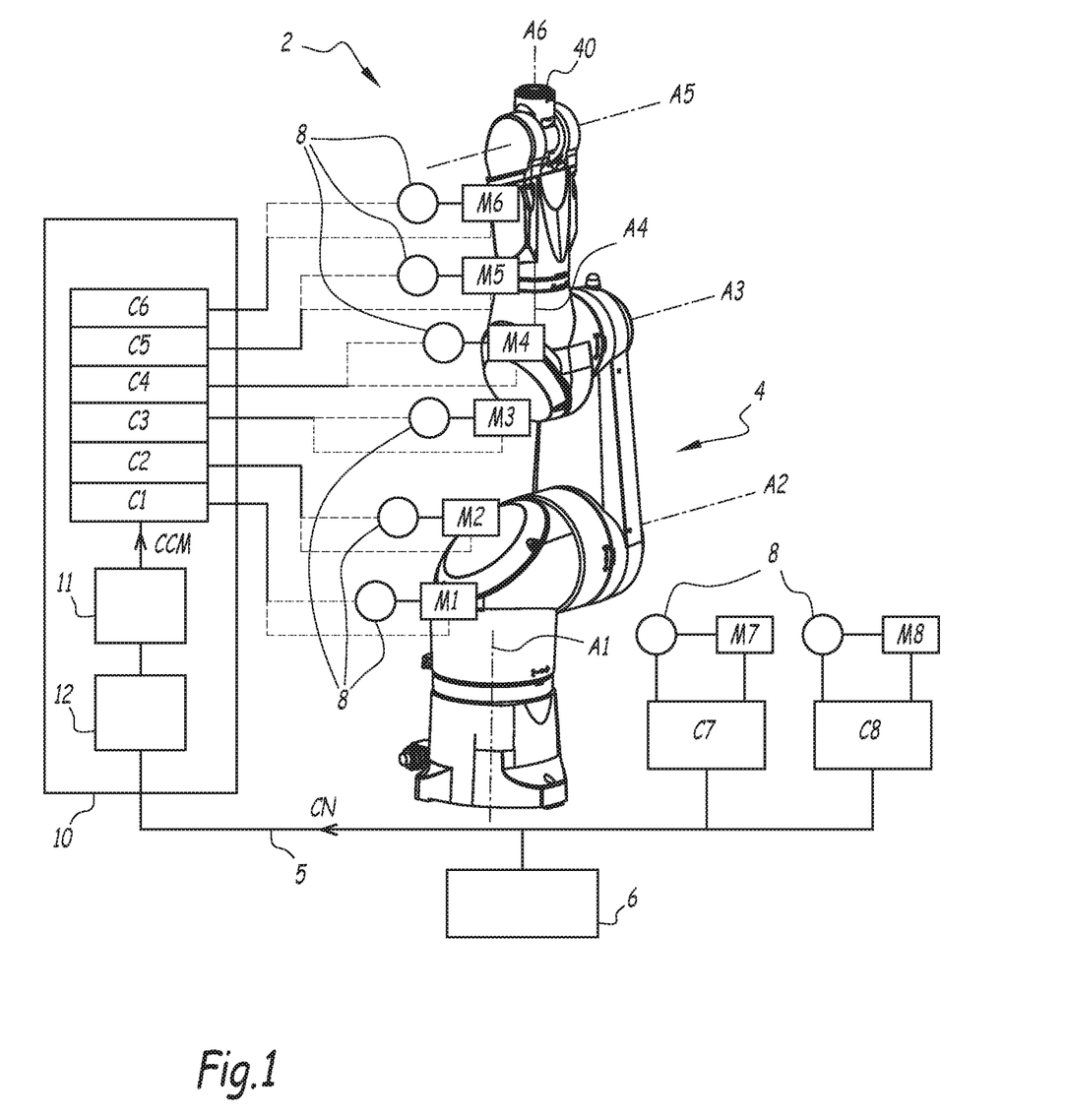
FIG. 1 shows a simplified schematic representation of an automated work cell comprising an articulated robot arm for implementing a method according to the invention.

The invention will be better understood and other advantages thereof will appear more clearly in the light of the following description of a control method according to its principle, given by way of a non-limiting example and with reference to drawings, wherein:

FIG. 1 represents an automated work cell 2, which comprises a robot for industrial use. The robot comprises a robot arm 4 articulated in at least three degrees of freedom.

The work cell 2 also comprises a control center 6, of the programmable logic controller type, abbreviated PLC, controlling a work method of the work cell 2.

The control center 6 comprises, in particular, an electronic calculator, such as a microprocessor or a programmable microcontroller, and also one or more computer memories (not shown). The memories are connected to the electronic computer and contain executable instructions including action sequences required for the actualization of an automated method of operation of the cell 2. These sequences are stored in the form of programs, also called applications.

The robot arm 4 here comprises several parts, or segments, articulated in pairs around axes of articulation each corresponding to a degree of freedom of the robot arm 4. The robot arm 4 also comprises a controllable tool 40, also referred to as an effector. The tool 40 is, for example, a clamp or a sensor.

In this example, the robot arm 4 shown is a robot arm with six axes, i.e. six degrees of freedom. The articulations here are pivotal links. The robot arm 4 thus comprises six degrees of freedom in rotation, wherein each is associated with one of the axes of articulation. The axes of articulation are here denoted A1, A2, A3, A4, A5 and A6.

Alternatively, the robot arm 4 may be different. It may, in particular, be a robot with a different number of axes of articulation, such as, for example, a four-axis SCARA robot. In the case of the SCARA robot, part of the degrees of freedom corresponds to rotational movements along part of the axes of articulation, while the other degrees of freedom correspond to translational movements along other axes of articulation. In other words, a part of the segments of the robot arm are articulated by pivot links, while another part of the segments of the robot arm are articulated by means of slide links.

According to yet another variant, the robot arm is of a Cartesian type, wherein the degrees of freedom are each associated with a translation movement along one of the respective axes of articulation.

The robot arm 4 also includes controllable motors, which make it possible to maneuver the parts of the robot arm 4 relative to one another.

The motors M1, M2, M3, M4 and M6 are respectively associated with the axes A1 to A4 and A6. For example, the motor M2 is adapted to maneuver two segments of the robot arm 4 relative to each other along the axis of articulation A2, i.e. in this case in a rotational movement about the axis A2. Actuation of the motor M5 causes rotation of the axes A5 and A6. There is therefore a coupling between the axes A5 and A6, while a rotation of the axis A5 alone, requires the implementation of the M5 and M6 motors.

Preferably, the motors M1 to M6 are brushless synchronous electric motors. They may be coupled to gearboxes.

The robot arm 4 also comprises sensors 8, also referred to as encoders, wherein each is associated with a motor M1 to M6 of the robot arm 4. Each sensor 8 is adapted to measure the angular position of the shaft of one of the motors M1 to M6 of the robot arm 4.

Alternatively, in the case where the degree of freedom associated with the geometrical axis corresponds to a translation movement, the sensor 8 may be a sensor that is able to measure a displacement in translation, or also an encoder if the translational movement is controlled by a rotary motor.

Alternatively, in the case where the number of degrees of freedom is different, the number of motors is adapted accordingly. The same goes for the number of sensors 8.

The work cell 2 also comprises a robot controller 10, whose role is to control the movement of the robot arm 4 according to instructions issued by the control center 6.

For this purpose, the robot controller 10 comprises motor controllers adapted to drive the motors M1 to M6 of the robot arm 4. Each motor controller is associated with a motor M1 to M6 to provide electric current to the terminals of the corresponding motor, in response to control commands and appropriate regulation ensured by means of position information provided by the sensor 8 associated with the corresponding motor.

In this example, the robot controller 10 comprises six motor controllers, denoted C1, C2, C3, C4, C5 and C6. Each motor controller C1 to C6 is respectively associated with a motor M1 to M6. For example, the motor controller C1 is associated with, and drives, the motor M1.

The motor controllers C1 to C6 are identical in this example.

Alternatively, the motor controllers C1 to C6 may be built differently. For example, the motor controllers C1 to C6 may be replaced by the same shared electronic calculation unit and related to power stages each of which is associated with a motor. The shared calculation unit provides control of the position, speed and supply current for all the motors M1 to M6, and provides the power stages with calculated current commands, wherein, as a result, each power stage electrically supplies the corresponding motor with power.

According to one variant, the motor controllers C1 to C6 are implemented by software via the communication card 12 and the calculation unit 11.

According to another variant, the motor controllers may be simultaneously associated with several of the motors M1 to M6 in order to drive these motors. For example, the same motor controller may be associated with two motors, or three motors, or six motors.

The cell 2 also comprises a communication bus 5 which connects the control center 6 to the robot controller 10.

The communication bus 5 is a field bus that is adapted to authorize synchronous data exchange in real time between the control center 6 and the robot controller 10.

In particular, the communication bus 5 allows the exchange of data during communication cycles that are repeated periodically in time with a predefined frequency.

In this example, the control center 6 is master and the robot controller 10 is slave on the communication bus 5.

The communication bus 5 here complies with the "PROFINET" communication protocol.

Alternatively, other protocols and/or other types of field bus may be used. For example, the communication bus 5 may be of the "Controller Area Network" type, and may operate according to the "CANOPEN" communication protocol.

The robot controller 10 is equipped with a calculation unit 11 and a communication card 12.

The communication card 12 is connected to the communication bus 5, in order to provide the interface between the robot controller 6 and the communication bus 5.

The calculation unit 11 comprises a microprocessor adapted to execute software instructions that are provided to the calculation unit 11. The calculation unit 11 also comprises computer memories (not shown).

In this example, the calculation unit 11 is connected to the communication card 12 by means of a data link such as a PCI internal bus.

The work cell 2 also comprises additional equipment that is separate from the robot arm 4 and is intended to operate jointly with the robot arm 4, i.e. in this case to guide mechanical parts towards the robot arm 4 during its operation. For example, this additional equipment may be conveyor belts.

This equipment is operated here by two motors M7 and M8, wherein each is driven by a motor controller, respectively C7 and C8. The motors M7, M8 and the motor controllers C7, C8 are here analogous to those of the robot arm 4.

The motors M7 and M8 are also equipped with sensors 8 similar to the sensors of the robot arm 4. The controllers C7 and C8 are connected to the control center 6 via the communication bus 5, in order to receive instructions from the control center 6.

Figure 2:
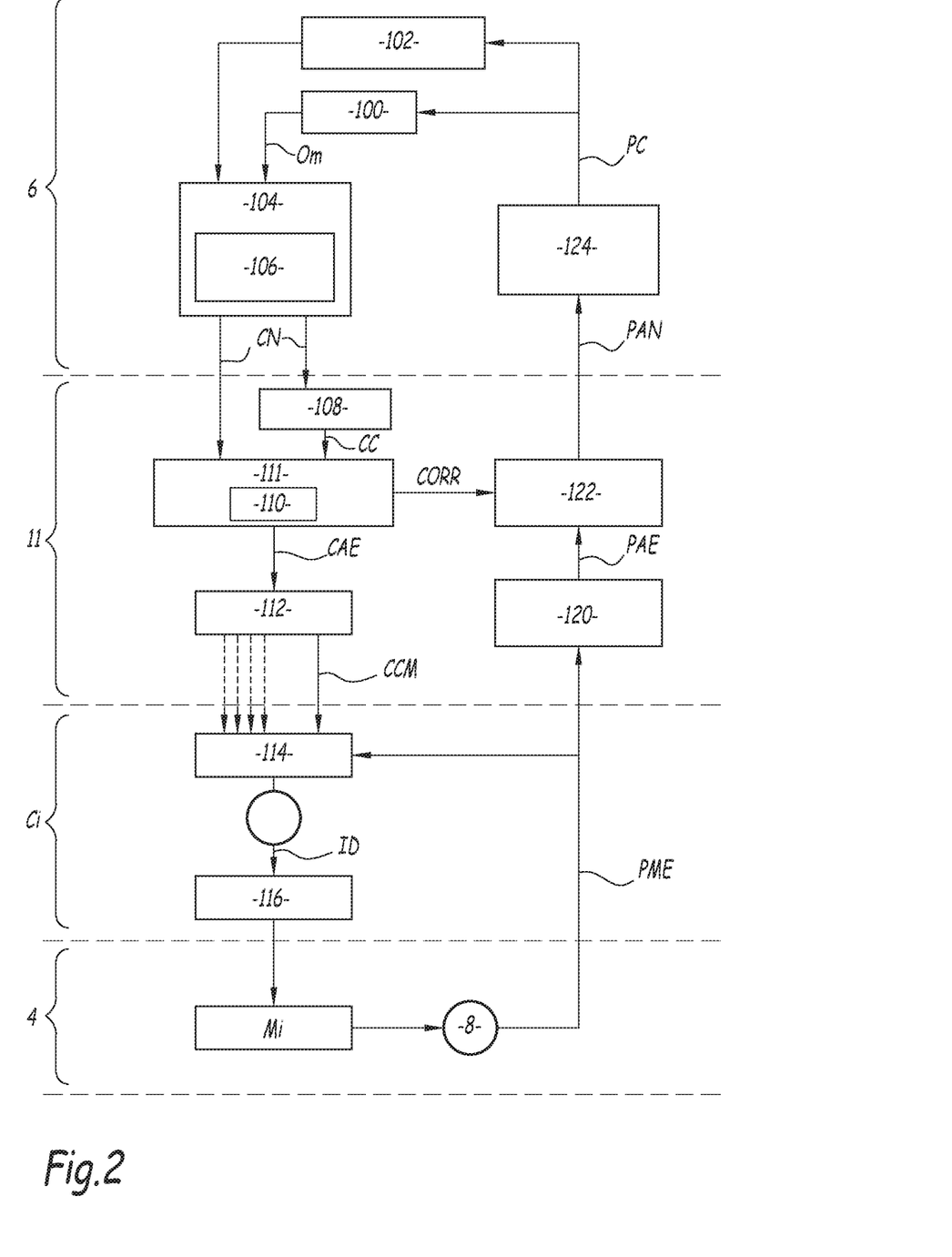
FIG. 2 shows a block diagram showing the operation of the work cell of FIG. 1.

FIG. 2 illustrates in more detail the operation of the control center 6 and the robot controller 10 in controlling the robot arm 4 and, ultimately, in controlling the movement of the tool 40.

The control center 6 here is programmed to process movement commands of the robot arm 4 and to generate, in response, articular position instructions, intended to be subsequently transmitted to the robot controller 10 in order to control the robot arm 4 accordingly.

The movement commands, denoted Om, define a trajectory by Cartesian coordinates that the robot arm 4 must follow or, more precisely, that a specific point of the robot arm 4 must follow. For example, this specific point may belong to the tool 40. For example, Om movement commands include points and orientations defined in the Cartesian space.

The Om movement commands are here expressed as executable instructions within a program 100. The program 100 is stored in a memory of the control center 6 and is executable by the electronic control center of the control center 6.

For example, the Om movement commands are "MOVE" type instructions expressed in an appropriate programming language. The instructions of the program 100 are executed step by step by the control center 6.

In an alternative and/or complementary manner, the Om movement commands may be directly transmitted to the control center 6 by an operator, by means of a manual control center 102 referred to as a "teach pendant". This manual control center 102 allows the operator to move the robot arm 4 by directly entering particular positions.

The control center 6 further comprises a trajectory generator 104 that is implemented in software form, for example, and is implemented by means of the electronic computer and by means of executable instructions stored in the memories of the control center 6.

The trajectory generator 104 is configured to automatically generate articular position instructions from the received Om movement commands in each operating cycle for each of the axes A1 to A6.

To do this, the trajectory generator 104 is based on a theoretical inverse kinematic model 106 of the robot arm 4.

In a known manner, a "direct" kinematic model of the robot arm 4 makes it possible to calculate movements of the robot arm 4 expressed in the form of Cartesian coordinates from the articular displacements for each of the axes A1 to A6, in this case rotation values about the axes A1 to A6.

This kinematic model is a function of geometrical parameters of the robot arm 4 and also of the type and configuration of the articulations of the robot arm 4. For the purposes of the present description, a model is said to be "theoretical" or "nominal" when it is parameterized by theoretical geometrical parameters, corresponding to an ideal robot arm.

A kinematic model is said to be "actual", when it is parameterized by actual geometrical parameters of the robot arm 4, resulting from measurements of the physical properties of the robot arm 4. In fact, the robot arm 4 experiences a more or less significant deviation when compared to the ideal robot arm, because of variability inherent to its manufacturing process.

The so-called "inverse" kinematic model makes it possible to calculate, in a corresponding manner, articular displacements for each of the axes A1 to A6 from the movements of the robot arm 4 expressed in the form of Cartesian coordinates. It thus corresponds to a mathematical inversion of the so-called "direct" kinematic model.

In this example, the theoretical inverse kinematic model 106 is simple because of the unique nature of the articulations and their configuration. The articulations are all pivot links. The axes A2 and A3 are parallel. The axes A4, A5 and A6 are concurrent. The inversion calculations may then be carried out by means of analytical methods, such as the so-called "Paul" method described in Richard P. Paul's "Robot Manipulators: Mathematics, Programming and Control", MIT Press, 1981.

Thus, thanks to the theoretical inverse kinematic model 106, the trajectory generator 104 calculates nominal or theoretical articular instructions, denoted CN, for each axis of articulation A1 to A6.

For the purposes of the present description, the term "articular instruction" designates an articular position instruction value for a given axis of articulation of the robot arm 4. In this example, these articular instructions are values of angles of rotation about the corresponding axis of articulation.

Due to the geometrical differences between the actual robot arm 4 and the ideal robot arm on which the inverse theoretical kinematic model is based, these theoretical articulated instructions CN must be corrected, so that the trajectory of the robot arm 4 corresponds to that defined by the movement commands Om.

The calculation unit 11 is itself programmed, for example by means of executable instructions stored in the memories of the robot controller 10 to determine the articulation instruction correction to be applied, in order to determine effective articular instructions CAE.

To do this, the calculation unit 11 first relies on the theoretical direct kinematic model 108 to recalculate the Cartesian positioning instructions CC and also relies on the actual inverse kinematic model, denoted 110, using actual geometric parameters.

The actual geometrical parameters of the robot arm 4 are, for example, stored in a memory of the robot controller 10. They may come from the prior implementation of a method for calibrating the robot arm 4.

The actual inverse kinematic model 110 makes it possible to calculate actual articular instructions from the Cartesian instructions by using the actual geometrical parameters.

By "actual articular instructions" is meant here the displacement values that would be achieved for the axes of articulation by taking into account the deviations of the robot arm 4 compared with the ideal robot arm.

More specifically, the calculation unit 11 is programmed to calculate the actual articular instructions and to compare them to the nominal articulation instructions CN, and to define an articulation instruction correction value CORR to be added to the nominal articulation instructions CN in order to obtain effective articular instructions denoted CAE. This program appears under reference 111 on the block diagram of FIG. 2.

Advantageously, the calculation unit 11 optionally comprises a filter or filtering module (not shown), for example implemented by executable instructions or by a dedicated signal processor referred to as DSP. The filtering module is configured to filter the analog or digital signal that is representative of the calculated instruction correction values CORR.

Preferably, the filtering module comprises a low-pass filter, to eliminate the frequency components of the signal which correspond to the excitation eigenfrequencies of the robot arm 4 itself. This makes it possible to avoid the eigenfrequencies of the robot arm being excited.

For example, the filter may comprise a so-called boxcar filter, i.e. whose transfer function is a boxcar function also known as a "gate function". Such filters make it possible to obtain a finite impulse response and are simple to implement.

As an illustrative example, three identical boxcar filters applied in series may be used here, wherein each filter is defined by a gate function with a duration of 100 ms. This makes it possible to ensure the continuity of the accelerations during the displacement of the robot arm 4.

The calculation unit 11 also contains a kinematic transmission model, denoted 112, for calculating motor control instructions CCM from the effective articular instructions CAE. In a known manner, the kinematic model of the transmissions makes it possible to model the reduction ratios and possible couplings between different axes of articulation, wherein the latter take into account the fact that an articulated instruction can affect several motors M1 to M6. In our example, the kinematic model of the transmissions 112 takes into account the coupling of the axes A5 and A6.

In addition, the calculation unit 11 is also programmed to allow the feedback of position information from the sensors 8 of the robot arm 4.

For this purpose, the calculation unit 11 comprises and implements an inverse kinematic model of the transmissions, denoted 120, and a module 122 for applying the correction values CORR. From this model 120, the calculation unit 11 is configured to calculate effective articulation positions PAE as a function of the effective articulation positions PME measured by the sensors 8 of the robot arm 4.

The module 122 makes it possible to calculate nominal articulation positions PAN from the effective articulation positions PAE as a function of the values of articular instruction corrections CORR.

Similarly, the control center 6 is programmed to calculate Cartesian positions PC from the nominal articular positions PAN using the theoretical direct kinematic model 124.

Thus, the measured position values may be escalated to the control center 6 by being corrected transparently for the execution of the program 100.

The motor controllers C1 to C6 are each adapted to generate, from the motor control instructions CCM, power supply currents, or current instructions, denoted ID, to drive the motors M1 to M6. For example, the motor controllers C1 to C6 may comprise electronic cards housed in the robot controller 10, wherein each of them contains an electronic calculator.

The generation of the current instructions ID by each of the motor controllers C1 to C6 is carried out according to the corresponding motor control commands CCM received from the calculation unit 11 and is accompanied by current regulation performed by means of servo-control loops and based on position data measured by the corresponding sensor 8. In this example, each motor controller C1 to C6 comprises a servo-control loop 114 in position and in speed and a current servo-control loop 116.

In FIG. 2, the motor controllers C1 to C6 are designated by the generic reference Ci, while the motors M1 to M6 are designated by the generic reference Mi, where "i" is an integer between 1 and 6.

An example of operation of the cell 2 is now described with reference to FIGS. 3, 4 and 5.

This method is here implemented articularly by the electronic control center of the control center 6 and by the calculation unit 11, for example by executing dedicated executable instructions contained in the respective computer memories of the control center 6 and the robot controller 10.

First of all, during a step 200, one or more movement commands Om are supplied to the control center 6. For example, the control center 6 may execute a previously provided robot control program to generate a succession of corresponding movement commands Om for the stepwise movement of the robot arm 4 and, optionally, for controlling the M7 and M8 motors controlling the additional equipment of the central unit 2.

Alternatively and/or in a complementary manner, these movement commands Om are provided by means of the manual control box 102. For example, these movement commands Om may define positions that the robot arm 4 must adopt.

Then, during the step 202, a trajectory is generated by the trajectory generator 104 by calculating nominal articular instructions CN from movement commands Om.

At the end of step 202, there is a set of nominal articulated instructions CN associated with the various axes of articulation A1 to A6. At this stage, the instructions CN are based on the theoretical parameters of the robot arm 4 and do not take into account the actual geometry of the robot arm 4.

During the step 204, the nominal instructions CN are transmitted to the calculation unit 11 of the robot controller 10 via the communication bus 5.

For example, for each communication cycle, a data telegram is sent by the control center 6 via the communication bus 5, wherein this telegram contains the values of the nominal instructions CN for each of the articulation axes A1 to A6 calculated for this communication cycle. This telegram is then received by the communication card 12, which transmits the corresponding values to the calculation unit 11 in the form of appropriate signals via the internal bus of the robot controller 10.

Then, during a step 206, implemented here by the calculation unit 11, effective articular instructions CAE are calculated from the nominal instructions CN, to take into account the actual geometrical parameters of the robot arm and their deviation compared to the theoretical geometrical parameters.

Figure 4:
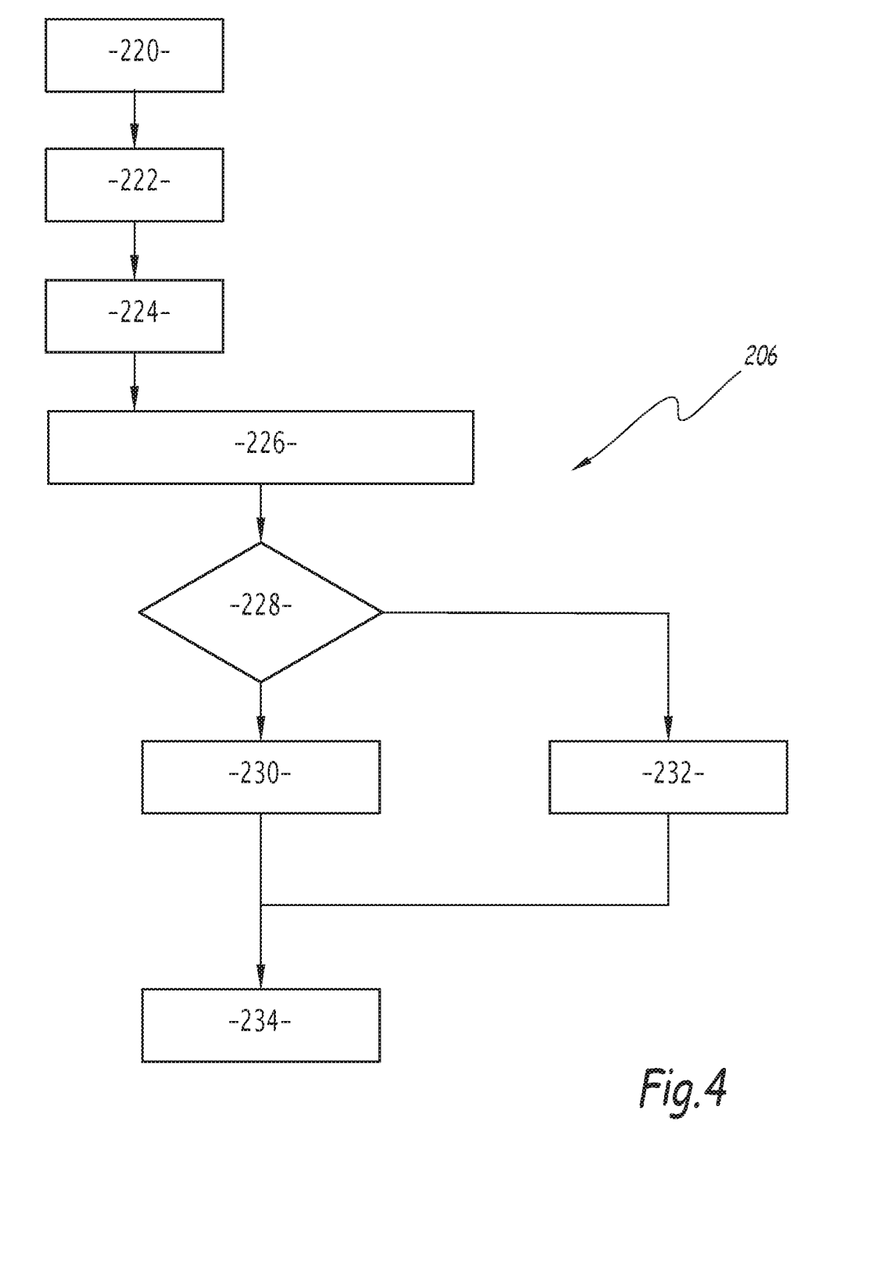

As illustrated in FIG. 4, this step 206 first includes an operation 220 for acquiring the nominal instructions CN.

In an operation 222, the Cartesian instructions CC are calculated from the theoretical direct kinematic model 108 using the theoretical parameters.

During an operation 224, the actual articular instructions are calculated from the Cartesian instructions CC. This calculation is performed using the actual inverse kinematic model 110 associated with the actual geometrical parameters of the robot arm 4. It is more complex because the simplifications resulting from the type of arm used and taking into account a perfect geometry, are no longer applicable. In fact, the actual geometrical parameters may reflect the fact that two theoretically parallel axes are not so in reality. Inversion may no longer be performed analytically but requires the implementation of numerical resolution methods such as Newton's methods. Then, during an operation 226, for each axis A1 to A6, the absolute value of the difference between the actual articular instruction and the nominal articular instruction CN is calculated.

This absolute value is then compared to a predefined threshold during an operation 228.

If the absolute value is strictly greater than the predefined threshold, then during an operation 230, the articular instruction correction value CORR is chosen to be equal to zero.

On the other hand, if the absolute value is less than or equal to the predefined threshold, then, during an alternative operation 232, the articular instruction correction value CORR is chosen to be equal to the value of the difference between the actual articular instruction and the nominal articular instruction CN.

The calculation of the instruction correction values CORR based on the comparison with the threshold value makes it possible to avoid excessively high corrections being implemented for unique configurations of the robot arm 4. By choosing the predefined threshold equivalent to 1 degree of angular displacement of the axis or equivalent to 1 mm of linear displacement in the case of a slide type axis of articulation, the passage of unique configurations, which generate significant differences between the nominal articular instructions and the actual articular instructions, is satisfactory.

However, according to one variant, the comparison with the predefined threshold is omitted and the articulation instruction correction value CORR is systematically chosen to be equal to the value of the calculated difference. Then, the operations 228, 230 are omitted and the operation 232 is implemented immediately after the operation 226.

Advantageously, during the operations 230 and 232, the calculated articular target correction value CORR is filtered by the calculation unit 11 by means of the filtering module, as previously explained. In particular, during the passage of the unique configurations, the filtering allows the smoothing of discontinuities generated by the implementation of the correction threshold.

Finally, during an operation 234, each calculated articulation instruction correction value CORR is added to the corresponding nominal articular instruction value CN, in order to obtain the corresponding effective articulation instruction values CAE.

In other words, the effective articulation instruction CAE here is the sum of the nominal articulation instruction CN and the instruction correction value CORR.

At the end of step 206, therefore, the effective CAE articular instructions for each of the axes of articulation A1 to A6 are available for the corresponding communication cycle.

Figure 3:
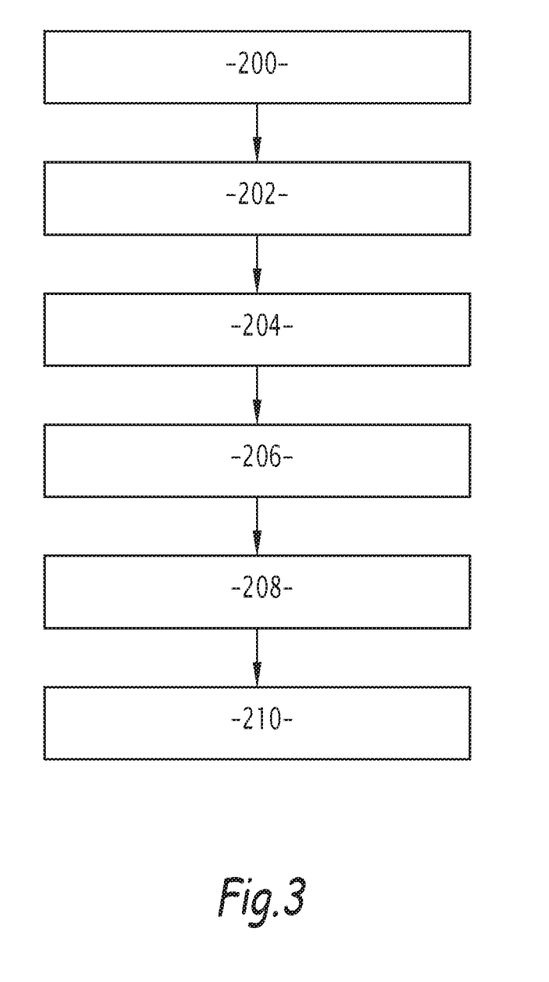
FIGS. 3 to 5 show flow charts representing steps of the control method according to the invention of the work cell of FIG. 1.

As illustrated in FIG. 3, during a step 208, the motor control instructions CCM for each motor M1 to M6 are then calculated from the effective articular instructions CAE by the calculation unit 11 by means of the kinematic model of the transmissions 112. These instructions CCM are then transmitted to the corresponding motor controllers Ci, for example by means of cable links.

Then, in a step 210, the current instructions ID are calculated by each of the motor controllers Ci from the received motor control commands CCM. The current instructions correspond to electric currents which supply the windings of the motors M1 to M6. Step 210 is implemented here by the respective motor controllers Ci.

The Mi motors then move the segments of the robot arm 4 according to the corresponding axes or articulation, to reach the actual controlled positions. For example, the tool 40 is then brought to the desired position and orientation defined by the movement commands Om.

Figure 5:
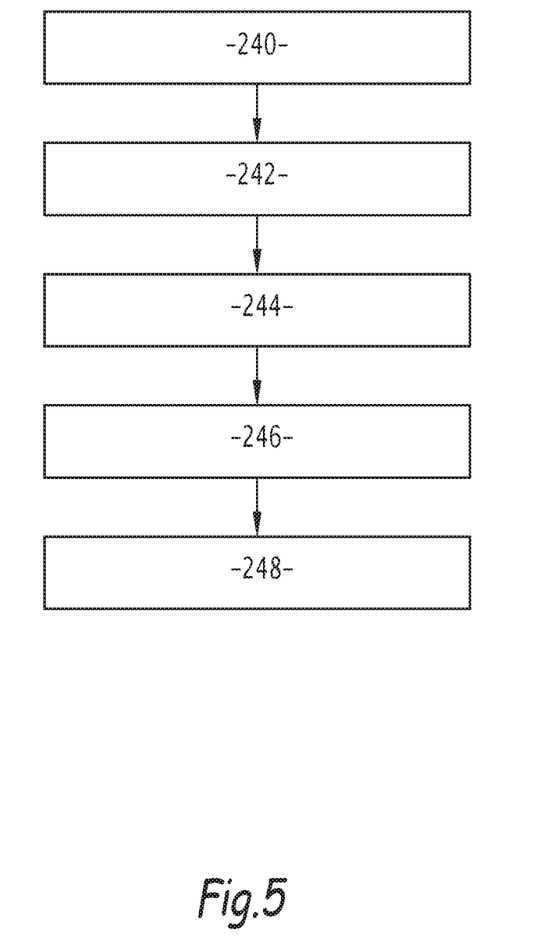

In parallel, as illustrated in FIG. 5, the actual positions of the robot arm 4 are measured by the sensors 8, and then the corresponding Cartesian positions are determined.

Thus, during a step 240, each sensor 8 of the robot arm 4 measures the effective position PME of the motor M1 to M6 with which it is associated.

Advantageously, when calculating the current instructions ID during step 210, the respective controllers Ci take into account these effective positions PME thus measured in order to ensure a current regulation. These effective positions PME are also transmitted to the calculation unit 11.

In the next step 242, the effective articulation positions PAE are calculated by the calculation unit 11 from the effective positions PME of the motors, by means of the inverse kinematic model of the transmissions 120.

Then, during a step 244, the nominal articulated positions PAN are calculated from the effective positions PAE, by applying, by means of the module 122, the corresponding CORR instruction correction values calculated during the step 206 for the corresponding communication cycle.

More precisely, this correction is applied here by subtracting, at the effective articulation positions PAE, the articular instruction corrections CORR applied to the corresponding nominal articular instructions CN.

Then, during a step 246, the nominal articulated positions PAN thus calculated are transmitted to the control center 6, and more specifically, to its electronic computer. For example, the card 12 sends back to the communication bus 5 and to the control center 6 the telegram previously received during this communication cycle, after having added the values of the nominal articular positions PAN calculated by the calculation unit 11.

Then, advantageously, during a step 248, the Cartesian positions PC corresponding to the nominal articular positions PAN are calculated by the control center 6. This calculation is carried out by means of the direct theoretical kinematic model 124.

The Cartesian positions PC thus calculated are, for example, used by the electronic computer when it executes the program 100, for example because a sequence contained in this program requires it to be checked that the robot arm 4 has moved in accordance with the corresponding movement command Om. The electronic calculator of the control center 6 here is of the multitasking type, so that the Cartesian coordinates PC may be calculated in parallel with the execution of the program 100.

The Cartesian positions PC may also, if necessary, be transmitted to the manual control box 102 so that the operator may verify the correct execution of the requested movement.

In practice, however, because of the delay introduced by the measuring chain, the position values transmitted to the control center 6 for a communication cycle may correspond to a displacement of the robot arm 4 resulting from the application of articular instructions issued during a previous communication cycle.

The steps 202 to 248 are here repeated over time, for example iterated for each of the successive communication cycles between the control center 6 and the robot controller 10 until the trajectory of the robot arm 4 is complete.

By virtue of the invention, the development of the control program that is provided to the control center 6 does not require prior knowledge of correction values CORR or actual geometrical parameters. The actual geometrical parameters of the robot arm 4 are stored in the robot controller 10 and are used by the actual inverse kinematic model 110 for the correction of the articular instructions during the execution of the program.

Thus, to develop the control program, it may be assumed that the robot arm is a perfect robot arm, whose geometric properties are faithfully represented by the theoretical inverse kinematic model. It is not necessary, contrary to known methods, to take into account the actual parameters of the robot arm at the time of development of the control program.

In other words, the actual geometry of the robot arm is taken into account by the robot controller 10 and not by the control center 6.

The development of the control program of the work cell 2 is greatly simplified. In fact, this program may be implemented on different work cells without having to take into account the deviations from the perfect robot arm of their respective robot arms.

The invention does not exclude the control center from implementing a theoretical inverse kinematic model similar to that which is applied by the calculation unit. This theoretical inverse kinematic model nevertheless relies on theoretical geometrical parameters that are different from the actual geometrical parameters. For example, the theoretical inverse kinematic model may take Denavit-Hartenberg's formalism and require a numerical resolution of the inversion.

The embodiments and alternatives contemplated above may be combined with one another to generate new embodiments.

The invention claimed is:

1. Method for controlling an automated work cell, wherein the work cell comprises:
   a robot arm articulated with at least three degrees of freedom, wherein the robot arm may be controlled according to articular instructions and comprising motors that are adapted to maneuver parts of the robot arm;
   a control center able to control the operation of the work cell by movement commands;
   a robot controller, including motor controllers each controlling the operation of a motor;
   a communication bus between the control center and the robot controller;
   wherein this control method comprises the steps of:
   y) calculating, by the control center, nominal articular instructions using a trajectory generator, based on the movement commands;
   z) transmitting the calculated nominal articular instructions, via the communication bus, to a calculation unit belonging to the robot controller;
   wherein this control method further comprises steps consisting of:
   a) calculating, by the calculation unit, Cartesian instructions corresponding to the nominal articular instructions;
   b) calculating, by the calculation unit, actual articular instructions from the Cartesian instructions, taking into account actual geometric parameters of the robot arm;
   c) calculating, for each nominal articular instruction and from the actual articulation instruction, an articular instruction correction value;
   d) calculation for each nominal articular instruction and from the established articular correction instruction, an effective articular instruction, wherein the effective articular instruction is the sum of the nominal articular instruction and the articular correction instruction;
   e) calculating control commands for each motor controller from the calculated effective articulated commands;
   f) transmitting the motor control instructions to each motor controller to control the corresponding motor according to the motor control instruction.

2. The method according to claim 1, wherein in step c) the articular instruction correction value is chosen to be equal to zero if the absolute value of the difference between the actual articular instruction and the nominal articular instruction is greater than a predefined threshold, wherein the articular instruction correction value is chosen to be equal to the difference between the actual articular instruction and the nominal articular instruction in the contrary case.

3. The method of claim 1, characterized in that during step c), the articular instruction correction value is chosen to be equal to the difference between the actual articular instruction and the nominal articular instruction.

4. The method of claim 1, wherein in step c) a low-pass filter is applied by the calculation unit to the calculated instruction correction value.

5. The method of claim 4, wherein the applied filter is a finite impulse response low pass filter.

6. The method of claim 5, wherein the filter comprises three boxcar filters applied in series.

7. The method of claim 1, wherein it also comprises steps of:
   g) transmitting to the calculation unit, the actual position of the motors controlled by this controller;
   h) calculating, by the calculation unit and from the actual positions of the motors, effective articular positions of the robot arm;
   i) calculating, by the calculation unit, nominal articular positions of the robot arm, subtracting from each effective articular position the articular instruction correction value calculated for the corresponding nominal articular instruction;
   j) transmitting to the control center nominal articulation positions calculated in step i).

8. The method of claim 1, wherein during step y), the movement commands define positions and orientations of the robot arm expressed in a Cartesian coordinate system, while the control center implements a theoretical inverse kinematic model taking into account theoretical geometrical parameters of the robot arm.

9. The method according to claim 8, wherein during step y), the nominal articular instructions are calculated from a theoretical inverse kinematic model of the robot arm parameterized by theoretical geometrical parameters of the robot arm and in that, during step b), the actual articular instructions are calculated from a similar actual inverse kinematic model, parameterized by actual geometrical parameters of the robot arm.

10. An automated work cell comprising:
- a robot arm articulated with at least three degrees of freedom, wherein the robot arm may be controlled according to articular instructions and comprising motors that are adapted to maneuver parts of the robot arm;
- a control center, able to control the operation of the work cell from movement commands;
- a robot controller, including motor controllers each controlling the operation of a motor;
- a communication bus between the control center and the robot controller;

wherein the work cell is programmed to implement steps of:
- y) calculating, by the control center, nominal articular instructions using a trajectory generator, based on the movement commands;
- z) transmitting the calculated nominal articular instructions, through the communication bus, to a calculation unit belonging to the robot controller;

and wherein the work cell is further programmed to implement the steps of:
- a) calculating, by the calculation unit, Cartesian instructions corresponding to the nominal articular instructions;
- b) calculating, by the calculation unit, actual articular instructions from the Cartesian instructions, taking into account actual geometric parameters of the robot arm;
- c) calculating, for each nominal articular instruction and from the actual articulation instruction, an articular instruction correction value;
- d) calculation for each nominal articular instruction and from the established articular correction instruction, an effective articular instruction, wherein the effective articular instruction is the sum of the nominal articular instruction and the articular correction instruction;
- e) calculating control commands for each motor controller from the calculated effective articulated commands;
- f) transmitting the motor control instructions to each motor controller to control the corresponding motor according to the motor control instruction.

11. The automated work cell of claim 10, wherein during step y), the movement commands define positions and orientations of the robot arm expressed in a Cartesian coordinate system, while the control center implements a theoretical inverse kinematic model taking into account theoretical geometrical parameters of the robot arm.

12. The automated work cell of claim 11, wherein during step y), the nominal articular instructions are calculated from a theoretical inverse kinematic model of the robot arm parameterized by theoretical geometrical parameters of the robot arm and in that in step b), the actual articular instructions are calculated from a similar actual inverse kinematic model, parameterized by actual geometrical parameters of the robot arm.

13. The automated work cell of claim 10, wherein it comprises computer memories containing executable computer instructions adapted to implement steps y), z) and a) to f).

* * * * *